United States Patent [19]

Eichfeld

[11] Patent Number: 5,778,149
[45] Date of Patent: Jul. 7, 1998

[54] DEFUZZIFICATION DEVICE FOR A HIGH-RESOLUTION FUZZY LOGIC CONTROLLER

[75] Inventor: Herbert Eichfeld, München, Germany

[73] Assignee: Siemens Aktiengesellschaft, Munich, Germany

[21] Appl. No.: 776,423

[22] PCT Filed: Jul. 18, 1995

[86] PCT No.: PCT/DE95/00946

§ 371 Date: Jan. 29, 1997

§ 102(e) Date: Jan. 29, 1997

[87] PCT Pub. No.: WO96/04601

PCT Pub. Date: Feb. 15, 1996

[30] Foreign Application Priority Data

Jul. 29, 1994 [DE] Germany ............... 44 27 020.8

[51] Int. Cl.⁶ ............................................. G06G 7/00
[52] U.S. Cl. ............................ 395/3; 395/61; 395/900
[58] Field of Search .............................. 395/3, 61, 900

[56] References Cited

U.S. PATENT DOCUMENTS

| | | | |
|---|---|---|---|
| 5,459,816 | 10/1995 | Basehore et al. | 395/3 |
| 5,524,174 | 6/1996 | Eichfeld et al. | 395/3 |
| 5,600,757 | 2/1997 | Yamamoto et al. | 395/3 |

FOREIGN PATENT DOCUMENTS

| | | | |
|---|---|---|---|
| 0 573 845 | 12/1993 | European Pat. Off. | G05B 13/02 |
| 39 27 343 | 3/1990 | Germany | H03K 19/00 |
| 41 29 423 | 3/1993 | Germany | H03K 19/00 |

OTHER PUBLICATIONS

H. Hellendoorn, "Design And Development Of Fuzzy Systems At Siemens R&D", Second IEEE International Conference on Fuzzy Systems, California, 1993, pp. 1365-1370.

K. Goser et al., "Clevere Regler schnell entworfen", Automatisieren Fuzzy-Logik, Elektronik Jun. 1992.

*Primary Examiner*—Allen R. MacDonald
*Assistant Examiner*—Jason W. Rhodes
*Attorney, Agent, or Firm*—Hill & Simpson

[57] ABSTRACT

A defuzzification device in which, depending on selection signals (FA1, FA2) and aggregated regulation weights ($\gamma$), either in a maximum process a first/last maximum value at which an associated aggregated regulation weight is a maximum is selected as the sharp output value (g) and an activation signal (ENGARZ) is formed or, as an alternative, in a first or second center of gravity process (COG12) a sharp output value (g) is formed from center of gravity coordinates ($S_v$) and aggregated regulation weights ($\gamma_v$), alone or additionally using area measurement figures ($F_v$), adders (ADD1, ADD2) with a register (Z-Reg, N-Reg) connected downstream in each case, a multiplier (MULT) and a divider (DIV) being able to be used advantageously both for the first and for the second center of gravity process, and one of the adders (ADD2) being used for the formation of the activation signal (ENGARZ), if a defuzzification is being carried out according to the maximum process.

4 Claims, 5 Drawing Sheets

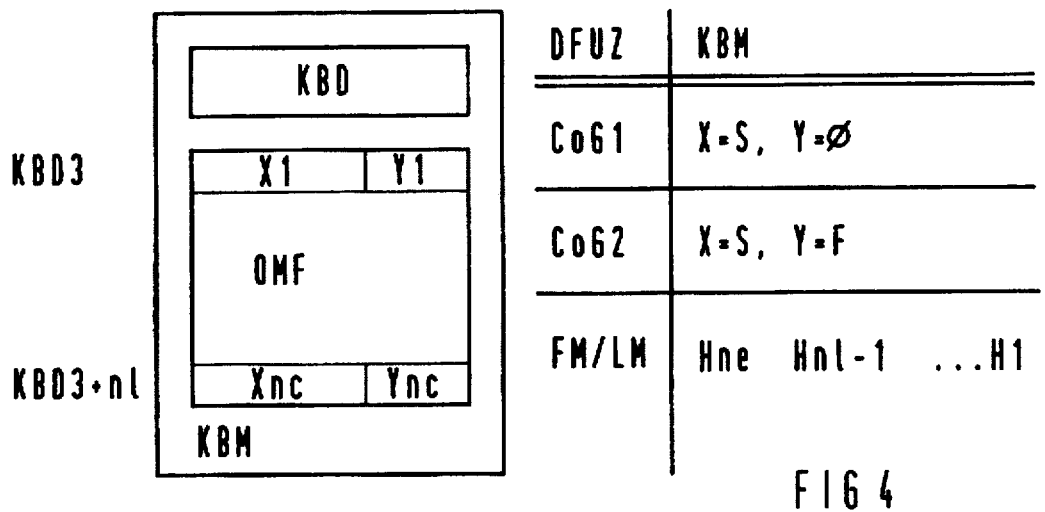
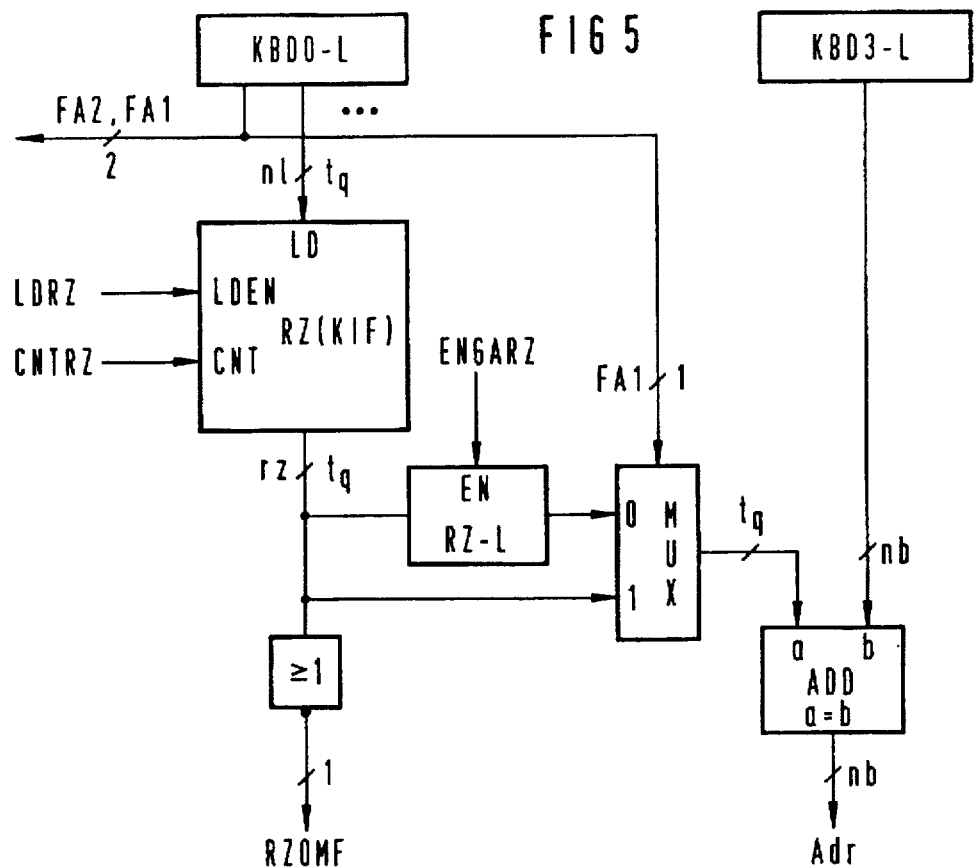

DEFUZZIFICATION DEVICE FOR A HIGH-RESOLUTION FUZZY LOGIC CONTROLLER

BACKGROUND OF THE INVENTION

1. Field of the Invention

The present invention relates generally to a defuzzification device in a fuzzy logic circuit.

2. Description of the Related Art

In fuzzy logic controllers with a resolution greater than 8 bits, it is expedient to store and to process the membership functions of linguistic variables in the form of measurement figures which characterize these membership functions. Therefore, defuzzification devices are also needed which form a sharp output value from aggregated regulation weights formed in an inference unit and from measurement figures for the membership functions of the linguistic output variables. Since there is a plurality of different defuzzification processes and at least the most important of these processes are intended to be optionally possible, in order to be able to achieve the most optimum regulation/classification results, this leads to a correspondingly high chip area requirement.

SUMMARY OF THE INVENTION

An object on which the invention is based is to provide a defuzzification device which is as fast as possible and has the smallest possible chip area, and with which the most important defuzzification processes may be carried oût.

This and other objects of the invention are achieved by a defuzzification device for a fuzzy logic controller which processes membership functions in the form of measurement figures, in which, depending on selection signals and aggregated regulation weights, either in a maximum process a first maximum value of the fuzzy unification set to be defuzzified, at which an associated aggregated regulation weight is a maximum, or a last maximum value of the fuzzy unification set to be defuzzified, at which an associated regulation weight is a maximum, is selected as the sharp output value and a corresponding activation signal for a knowledge base memory interface is formed or, alternatively, depending on selection signals, a sharp output value is formed either in a first center of gravity process, from center of gravity coordinates and aggregated regulation weights of membership functions or in a second center of gravity process from center of gravity coordinates, area measurement figures and aggregated regulation weights, in which a first adder with downstream counter register, a second adder with downstream denominator register, a multiplier and a divider are provided jointly for the first and second center of gravity process, and in which the second adder is used to form the activation signal if defuzzification is being carried out according to the maximum process.

Preferred embodiments of the device according to the invention, provide that a signal for discriminating between a defuzzification according to the first or second center of gravity process is carried out in that all the area measurement figures are encoded with zero in the case of the first center of gravity process and by a corresponding discrimination signal being formed by means of a NOR operation on the bits of the respective area measurement figure, computing time is being saved by no multiplication being carried out if the respective area measurement figure is equal to zero or equal to one.

BRIEF DESCRIPTION OF THE DRAWINGS

The invention will be explained below in greater detail using the drawings, in which FIG. 5 is a diagram of a part of the knowledge base memory interface to explain the significance of the control signal which occurs in the case of defuzzification according to the maximum process.

DETAILED DESCRIPTION OF THE PREFERRED EMBODIMENTS

Figure 1:
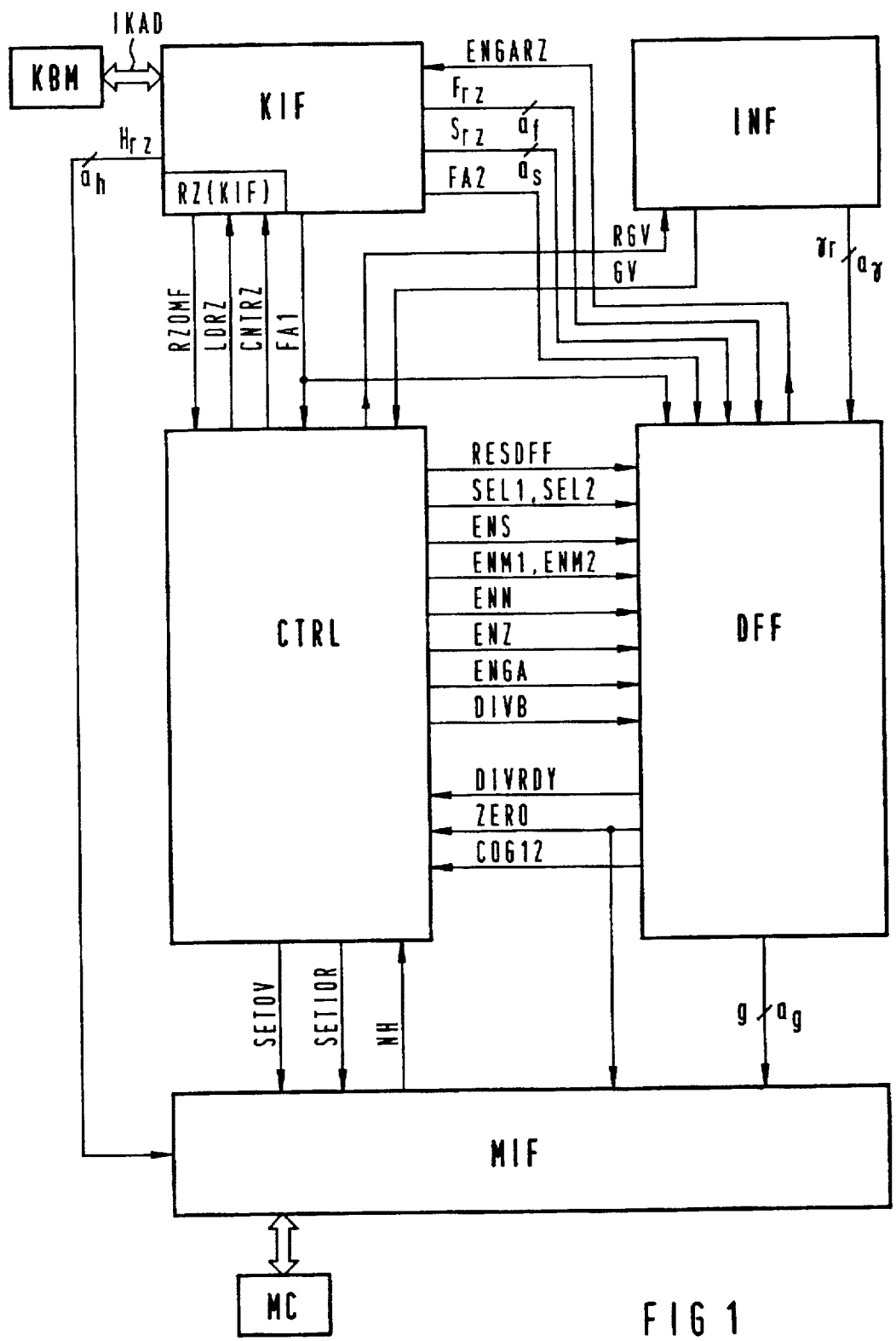
FIG. 1 is a block diagram of a high-resolution fuzzy logic controller having a defuzzification device according to the invention.

Shown in FIG. 1 is a block diagram of a high-resolution fuzzy logic controller, comprising a defuzzification device DFF according to the invention, a control unit CTRL, an inference unit INF, a knowledge base memory interface KIF belonging to a knowledge base memory KBM and a microcontroller interface MIF belonging to a microcontroller MC. The defuzzification device DFF according to the invention in this case receives from the control unit CTRL a series of control signals RESDFF, SEL1, SEL2, ENS, ENM1, ENM2, ENN, ENZ, ENGA and DIVB, and supplies to the control unit CTRL the control signals DIVRDY, ZERO and COG12. Via the knowledge base memory interface KIF, maximum values $H_{rz}$, area measurement figures $F_{rz}$, center of gravity coordinates $S_{rz}$ and signals FA1 and FA2 for determining the defuzzification process can be read from the knowledge base memory KBM via a bus IKAD, the maximum values $H_{rz}$ being read directly into the micro-controller interface MIF, the area measurement figures $F_{rz}$ and the center of gravity coordinates $S_{rz}$ being read into the defuzzification device DFF according to the invention, the selection signal FA1 being read into the control unit CTRL and into the defuzzification device DFF, and the selection signal FA2 being read into the defuzzification device DFF. The knowledge base memory interface KIF contains a reverse counter RZ(KIF), which can be loaded with an initial value by means of a load signal LDRZ from the control unit CTRL and is decremented by means of counting pulses CNTRZ from the control unit CTRL. If the value of the reverse counter RZ(KIF) is equal to zero, this is then indicated to the control unit CTRL by means of a signal RZOMF from the knowledge base memory interface. The control unit CTRL requests the inference unit INF via an interrogation signal RGV to send an aggregated regulation weight $\gamma_v$ to the defuzzification device DFF. As soon as a new aggregated regulation weight $\gamma_v$ is available, the inference unit reports this via a signal GV to the control unit CTRL. From the control unit CTRL, the microcontroller interface MIF receives an interrogation signal SETIOR and a signal SETOV for reporting valid output data and receives from the latter a signal NH (no hit) to determine whether at least one aggregated regulation weight is not equal to zero. In addition to the sharp output values g formed in the defuzzification device DFF, the control signal ZERO is also supplied to the microcontroller interface MIF. Furthermore, an activation signal ENGARZ for the knowledge base memory interface KIF is formed in the defuzzification device DFF according to the invention.

Figure 2:
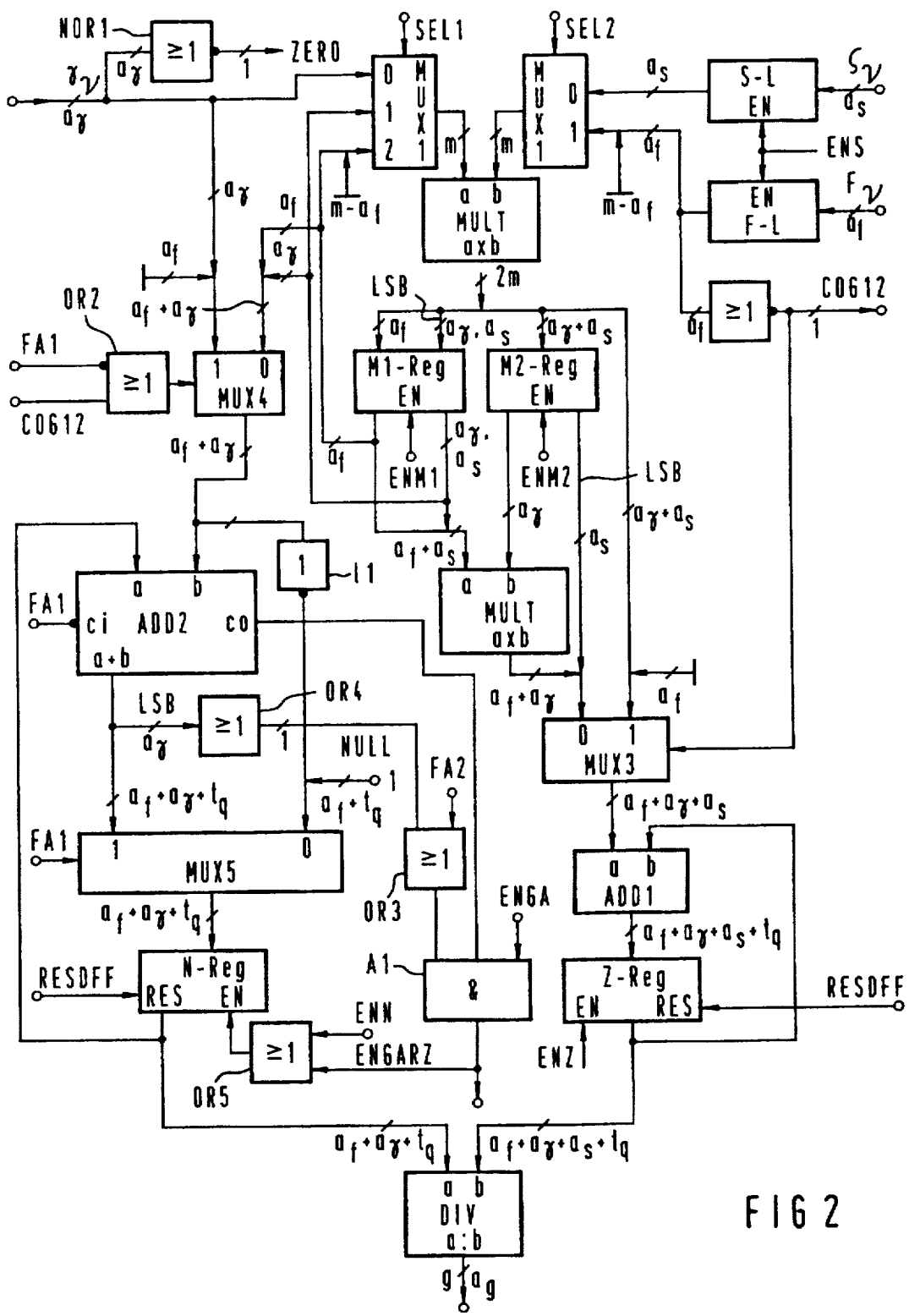
FIG. 2 is a circuit diagram of a defuzzification device according to the invention.

FIG. 2 shows a circuit diagram of a defuzzification device DFF according to the invention, in which aggregated regulation weights $\gamma_v$, having the word width $a_r$, fed to inputs of a NOR circuit NOR1, to a zero input of a multiplexer MUX1, which has a word width m, and to a one input of a multiplexer MUX4, which has a word width $a_{f+a_r}$, in the case of the multiplexer MUX4 those places carrying $a_f$ being fixed at logic zero. The previously inverted selection signal FA1 is ORed with a selection signal COG12 in an OR circuit OR2 to form a selection signal SEL4 for the multiplexer MUX4. The selection signal COG12 is in this case formed in the defuzzification device DFF from the $a_r$ bits of the area measurement figure $F_v$, with the aid of a NOR circuit NOR2, this signal being used at the same time for driving a multiplexer MUX3. A b input of a multiplier MULT is connected to an m-bit-wide output of a multiplexer MUX2 and receives, depending on the control signal SEL2, either the $a_s$-bit-wide output signal of a hold element S-L for the center of gravity values S, or an $a_r$-bit-wide output signal of a hold element F-L for the area measurement figures $F_v$, both hold elements being able to be driven by an activation signal ENS. The output of the multiplier MULT has a word width of 2 m and delivers input values for a register M1-Reg and a register M2-Reg, the register M1-Reg accepting $a_r$ higher-valued bits and $a_s$ or $a_s$ low-valued bits LSB, and the register M2-Reg having the word width $a_r+a_s$, and this register being able to be driven via activation signals ENM1 or ENM2. The output signal of the multiplier MULT is further fed to a one input of the multiplexer MUX3. $a_f$ bits of the entire word width $a_f+a_{65}+a_s$ of the multiplexer MUX3 permanently receiving a logic zero. The higher-valued $a_r$ bits of the register M1-Reg are fed back to a two input of the multiplexer MUX1 and form $a_f$ bits of the zero input of the multiplexer MUX4. The low-value $a_s$ or $a_s$ bits at the output of the register M1-Reg are fed back to a one input of the multiplexer MUX1 and form the remaining $a_s$ bits at the zero input of the multiplexer MUX4. The a input of the multiplier MULT can be switched through, depending on the selection signal SEL1, either to the zero input, to the one input or to the two input of the multiplexer MUX1. All the outputs of the register M1-Reg are connected to an a input of the adder ADD3, whose b input is connected to the $a_r$ higher-value bits of the register M2-Reg and whose output is connected, $a_f+a_r$ bits wide, to the zero input of the multiplexer MUX3. The $a_s$ lowvalue bits of the register M2-Reg are connected to the remaining bit lines of the zero input. The output of the multiplexer MUX3 simultaneously represents the a input of an adder ADD1, whose output is wired to the input of a counter register Z-Reg. The counter register Z-Reg can be driven by an activation signal ENZ and a reset signal RESDFF, and the output of this register is, on the one hand, fed back to a b input of the adder ADD1 and, on the other hand, it represents the counter input of the divider DIV, whose output supplies the sharp output values g with the resolution $a_g$. The $a_f+a_r$-bit-wide output of the multiplexer MUX4 is connected to the bit lines of a b input of an adder ADD2, whose inverting carry input $C_i$ is wired to the selection signal FA1, whose carry output CO is connected to an input of an AND circuit A1, and whose sum output is connected to an $a_f+a_r+t_q$-bit-wide one input of a multiplexer MUX5, the hit rate tq being the smallest natural number which is greater than the logarithm to the base 2 of the number of functions hit. The zero input of the multiplexer MUX5 receives, in this case via an inverter I1, inverted $a_r$ bits of the multiplexer output MUX4 and $a_f+t_q$ bit lines are permanently connected to logic one. The multiplexer MUX5 can be changed over by means of the selection signal FA1, and its $a_f+a_r+t_q$-bit-wide output is wired to the input of the denominator register N-Reg, whose output is, on the one hand, connected to the a input of the adder ADD2 and, on the other hand, is wired to the denominator input of the divider DIV. The $a_s$ least significant bits LSB of the output from adder ADD2 are ORed bit by bit by an OR circuit OR4, and the output of the OR circuit OR4 is wired to an input of a further OR circuit OR3 which has a further input which receives the selection signal FA2 and whose output is connected to an input of the AND circuit A1. A third input of the AND circuit A1 receives the activation signal ENGA, and the activation signal ENGARZ for the knowledge base memory interface KIF is present at the output of the AND circuit A1. This signal is ORed with the activation signal ENN in a further OR circuit OR5 and is used for the activation of the denominator register N-Reg, which can be reset by the reset signal RESDFF.

Figure 3A:
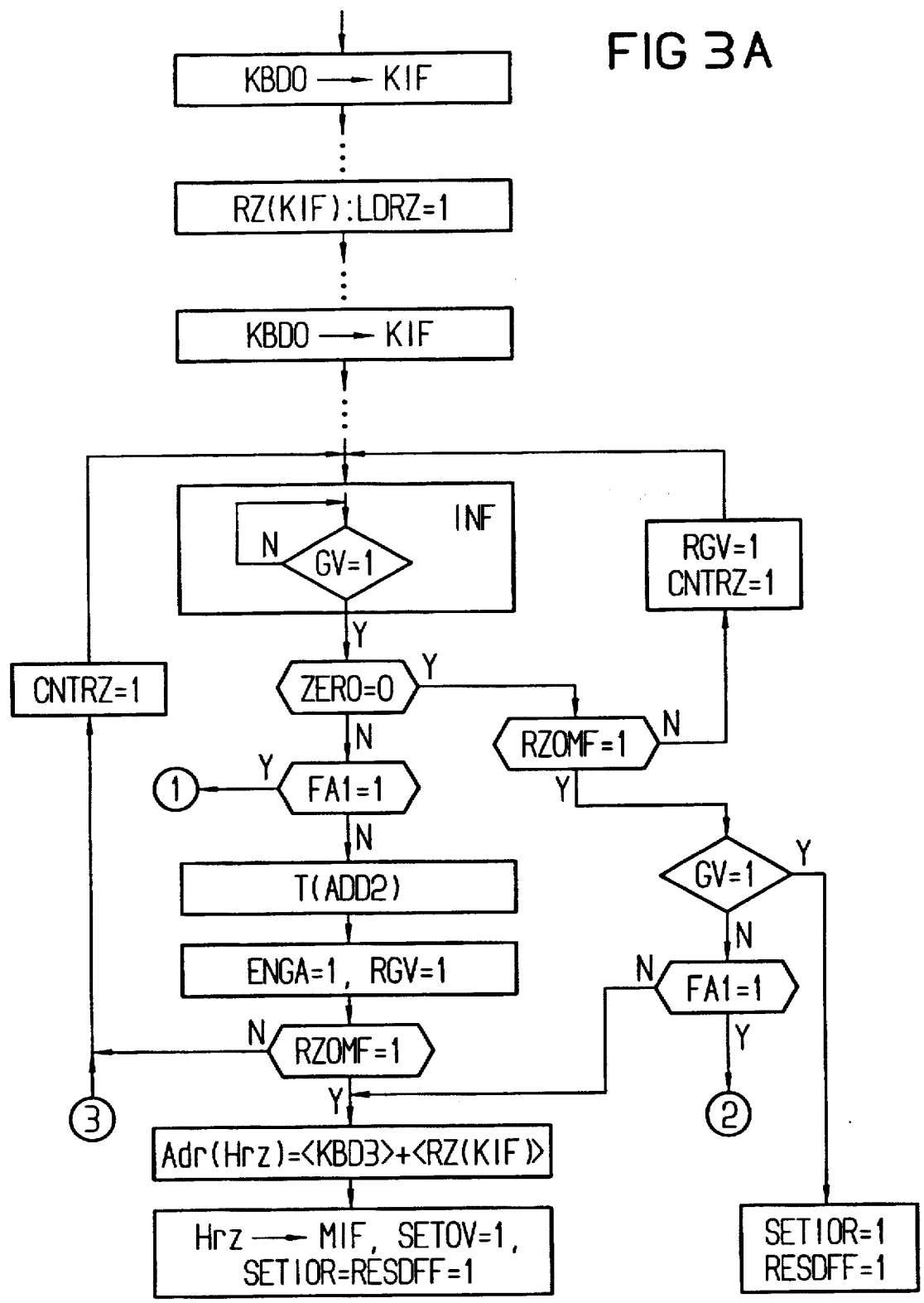
FIG. 3A is a first part of a flow diagram to explain the control signals of a defuzzification device according to the invention.
Figure 3B:
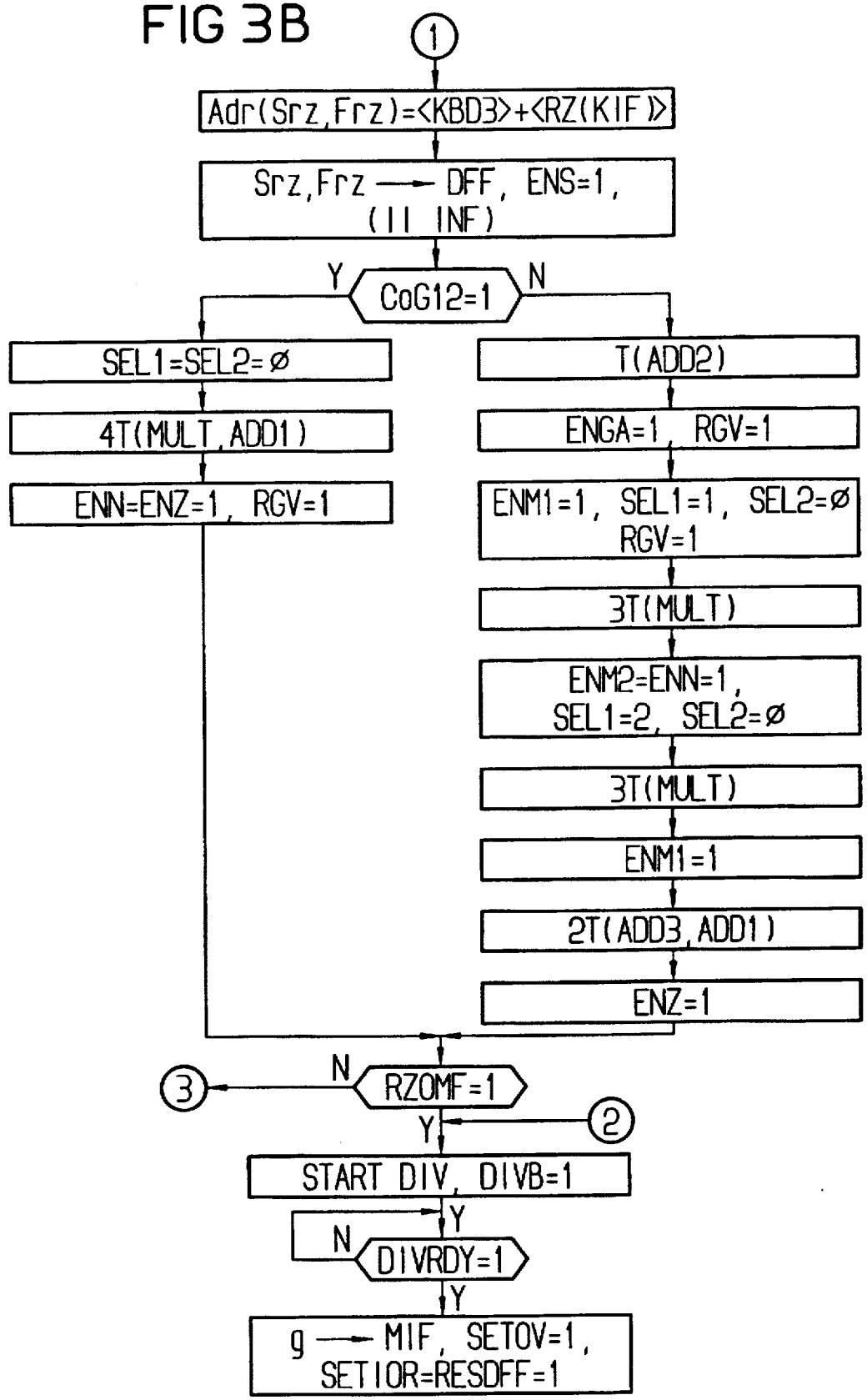
FIG. 3B is a second part of a flow diagram to explain the control signals of a defuzzification device according to the invention, FIG. 4 schematic diagram and a table which; shows a representation to explain the allocation of the knowledge base memory as a function of the defuzzification process selected.

Shown in FIG. 3A is a first part of a sequence program to explain the control signals. Here, a zeroth knowledge base descriptor word KBD0 is initially read into the knowledge base memory interface KIF, and the reverse counter RZ(KIF) in the knowledge base memory interface KIF is loaded with the number n1 of the output membership functions, provided the load signal LDRZ is equal to one. A third knowledge base descriptor word KBD3 is then loaded into the knowledge base memory interface KIF, the word representing the start address of the output membership function block OMF. Whereupon, as will be explained in more detail later, the output membership function block is loaded, depending on the defuzzification process, with measurement figures characterizing the respective membership functions, and represents one part of the knowledge base KBM. An inference formation INF, which is signalled to the control unit by means of the signal GV=0, is now carried out. When the inference formation has been finished, that is to say the signal GV is equal to one, the signal ZERO is formed from the aggregated regulation weights $\gamma_v$. If the respectively addressed regulation weight $\gamma_v$ is equal to ZERO, that is to say the signal ZERO=1, it is determined whether the reverse counter RZ(KIF) has already been counted down to zero, that is to say the signal RZOMF=1. If this is not the case, the reverse counter is decremented by one via the signal CNTRZ and, with the aid of the signal RGV=1, it is indicated to the inference unit INF that a further inference formation is necessary. For the case in which the signal RZOMF=1, that is to say the reverse counter has completely been decremented to zero, an interrogation is made as to whether any membership function has been hit. If this is not the case, the signal SETIOR for the microcontroller interface MIF is reset equal to one and the defuzzification circuit DFF is reset with the aid of the signal RESDFF=1. If a hit has been effected, that is to say the bit NH is not one, then the selection signal FA1 is interrogated as to whether a defuzzification is being carried out according to a maximum process LM/FM or according to one of the center of gravity processes COG1 COG2. If the selection signal FA1 is equal to zero, then the address of the respective maximum value $H_{rz}$ is formed from the start address of the third knowledge base descriptor word KBD3 and the intermediately stored reverse counter setting, the intermediate storage being effected by means of the activation signal ENGARZ originating from the defuzzification unit according to the invention, as soon as a maximum aggregated regulation weight is present. The maximum value $H_{rz}$ addressed in this way is taken over into the microcontroller interface MIF, the signals SETIOR and SETOV for the microcontroller interface are set equal to one and the defuzzification unit is reset by means of the signal RESDFF=1. If the respective regulation weight is not equal to zero, that is to say the signal ZERO=0, then, provided that the selection signal FA1=1, a branch is made to an entry point 1 and otherwise, because of the adder ADD2, a pause is made for one clock cycle, and thereafter the signals ENGA and RGV are set equal to one. This is followed by an interrogation of the reverse counter, if the latter is not yet at zero, a decrementation is triggered by means of the signal CNTRZ equals 1 and it followed by a further inference formation. However, if the reverse counter is already at zero, as already mentioned above, the address formation for the maximum value $H_{rz}$ and a transfer of the maximum value to the microcontroller interface MIF with the control information mentioned above are carried out. Shown in FIG. 3B is a second part of the flow diagram, which begins at the top with the entry point 1 mentioned in FIG. 3A, which corresponds to the state in which the inference formation INF has been finished, the respective aggregated regulation weight is not zero and a defuzzification is intended to be carried out according to a center of gravity process. If these conditions are fulfilled, the respective addresses Adr ($S_{rz}$, $F_{rz}$) are formed from the start address KBD3 and the respective state of the reverse counter RZ(KIF) and in this way the centers of gravity $S_{rz}$ and area measurement figures $F_{rz}$ are fed to the defuzzification device DFF according to the invention and the activation signal ENS is set=1. The inference formation is carried out in parallel with this procedure. The selection signal COG12, which as already mentioned is formed from the area measurement figures, is now interrogated as to whether a simplified center of gravity process COG1 on the basis of the aggregated regulation weights and the centers of gravity, or an extensive center of gravity process COG2 on the basis of the aggregated regulation weights, the centers of gravity and the area measurement figures is to be carried out. For the case in which the signal COG12 is equal to one, that is to say a simplified center of gravity process COG1 is being used, the selection signals SEL1 and SEL2 for driving the input multiplexers MUX1 and MUX2 in the defuzzification device are set equal to zero, a pause of four clock cycles is made because of the multiplier MULT and the adder ADD1 and then the activation signals ENN and ENZ are set=to 1 and the signal RGV is set=to 1. In the case of the extensive center of gravity process, a pause of one clock cycle is made due to the adder ADD2, and ENGA and RGV are set equal to one. After this, the activation signal ENMI, the selection signal SEL1 and the control signal RGV are set equal to 1 and the selection signal SEL2 is set to 0 and a pause of three clock cycles is then made because of the multiplier MULT. The activation signals ENM2 and ENN are then set equal to one and the selection signal SEL1 is set=to 2 and the selection signal SEL2 is set=to 0. A pause of three clock cycles is then made once more because of the multiplier MULT the activation signal ENM1 is subsequently set=to 1. Finally, a pause of two clock cycles is likewise made because of the adders ADD3 and ADD1, and the activation signal ENZ is set=to 1. In the case of both center of gravity processes, the denominator and the are now calculated and a branch is made to the entry point 3 in FIG. 3A, provided the reverse counter has not yet been counted down to zero, which means that the reverse counter is decremented by means of the signal CNTRZ=1, and a further inference formation or, respectively, the following steps are carried out. If the reverse counter has been counted down to zero, that is to say the signal RZOMF=1, then the division is started as soon as a division is initiated by the control clock CRTL by means of the signal DIVB=1. The division is carried out until its end is communicated to the control unit CRTL by means of the signal DIVRDY=1. If this is the case, then the sharp output value g is taken over into the microcontroller interface MIF, indicated by means of the signal SETOV=1 that a valid sharp output value is present. Furthermore, the signal SETIOR is set=1 and the defuzzification device DFF is reset with the aid of the signal RESDFF=1. The starting of the divider DIV and the following steps are also carried out when at the same time the respective aggregated regulation weight is equal to zero, the reverse counter has been counted down completely to zero, at least one membership function has been hit, that is to say the signal NH=0, and defuzzification is being carried out according to one of the center of gravity processes COG1 or COG2. FIG. 4 shows the knowledge base memory KBM with a knowledge base descriptor block KBD and an output membership function block OMF, the start address of the output membership function block OMF being described by means of the knowledge base descriptor word KBD3. For n1 membership functions, n1 cells are stored from the start address, one cell consisting of an X and a Y part, and the last cell having the address KBD3+n1. If the simplified center of gravity process is selected for the defuzzification process, then the X part of the addressed cell consists of the respective center of gravity coordinate value, and the Y part is filled with zeros. In the case of the more extensive center of gravity process COG2, the Y part of the addressed cell is filled, on the other hand, with the associated area measurement figure. For both the possible maximum processes FM/LM (first maximum/last maximum), the X part of the addressed cell is filled with a maximum value and the Y part with zeros, the maximum values being arranged according to size in such a way that the smallest maximum value is stored in the cell addressed by the start address and the largest maximum value is stored in the cell addressed by the address KBD3+n1. FIG. 5 is a significant part of the knowledge base memory interface KIF having the reverse counter RZ(KIF), a reverse counter hold stage RZ-L, a multiplexer MUX, an adder ADD, a hold stage KBDO-L for the zeroth knowledge base descriptor word, a hold stage KBD3-L for the third knowledge base descriptor word, that is to say for the start address, and having a NOR circuit NOR. The number n1 of the output membership functions can be loaded from the hold stage KBDO-L into the reverse counter RZ(KIF) as soon as the load signal LDRZ from the control unit CTRL permits this. The reverse counter RZ(KIF) may be decremented by the signal CNTRZ, and the signals of the bit lines at the output of the reverse counter are logically linked by means of the NOR circuit NOR to the signal RZOMF, which reports to the control unit CTRL when the reverse counter has been completely counted back to zero. The output of the reverse counter is connected both directly to a one input of the multiplexer MUX and, via the hold element RZ-L, to a zero input of the multiplexer MUX, whose selection input is driven by the signal FA1 from the zeroth knowledge base descriptor word. The hold element RZ-L has an activation input EN, which is supplied with the maximization signal ENGARZ produced in the defuzzification device DFF according to the invention and in this way, representative of a membership function, a relative address of the maximum value belonging to the respective membership function is intermediately stored. In the adder ADD, the start address from the hold element KBD3-L is added to the respective relative address at the output of the multiplexer MUX, and the address Adr for addressing the knowledge base memory KBM is formed.

Although other modifications and changes may be suggested by those skilled in the art, it is the intention of the inventor to embody within the patent warranted hereon all changes and modifications as reasonably and properly come within the scope of his contribution to the art.

I claim:

1. A defuzzification device for a fuzzy logic controller which processes membership functions in the form of measurement figures, comprising:

selecting means for selecting as a sharp output value one of a first maximum value and a last maximum value, said selection depending on selection signals and aggregated regulation weights in a maximum process, said selecting means selecting a first maximum value of a fuzzy unification set to be defuzzified at which an associated aggregated regulation weight is a maximum, said selecting means selecting a last maximum value of the fuzzy unification set to be defuzzified at which an associated regulation weight is a maximum, said selecting means including means for forming a corresponding activation signal for a knowledge base memory interface, means for forming a sharp output value in one of:

a first center of gravity process from center of gravity coordinates and aggregated regulation weights of membership functions and a second center of gravity process from center of gravity coordinates, area measurement figures and aggregated regulation weights, said selecting means including a first adder with downstream counter register, a second adder with downstream denominator register, a multiplier and a divider for the first and second center of gravity process and the second adder being connected to form the activation signal if defuzzification is being carried out according to the maximum process, said second adder having an input connected to receive the aggregated regulation weights, depending on the first selection signal, said second adder having an output connected to an input of a first multiplexer, an inverter unit having an input connected to receive the aggregated regulation weights and having an output connected to a further input of the first multiplexer, the output of the first multiplexer being wired to the input of the denominator register downstream thereof, whose output is fed back to a further input of the second adder, one of the selection signals being fed to a carry input of the second adder in inverted form and to a selection input of the first multiplexer in non-inverted form, a first OR circuit connected to receive bit by bit the number of least significant bits, which corresponds to the word width of the aggregated regulation weights, with the second selection signal, and the output of the first OR circuit being connected to a first input of an AND circuit, whose second input is connected to a carry output of the second adder, whose third input has an activation signal applied to it and whose output supplies the activation signal for the knowledge base memory interface, and a second OR circuit having a first input wired to the activation signal for the knowledge base memory interface, whose second input is wired to a further activation signal, and whose output is wired to an activation input of the denominator register.

2. A defuzzification device according to claim 1 further comprising:

via a first multiplexer, aggregated regulation weights from an inference unit or intermediate results from an interception register being alternatively fed to an input of a multiplier and via a second multiplexer, the area measurement figures or center of gravity coordinates are alternatively fed to a further input of the multiplier.

3. A defuzzification device for a fuzzy logic controller which processes membership functions in the form of measurement figures, comprising:

selecting means for selecting as a sharp output value one of a first maximum value and a last maximum value said selection depending on selection signals and aggregated regulation weights in a maximum process, said selecting means selecting a first maximum value of a fuzzy unification set to be defuzzified at which an associated aggregated regulation weight is a maximum, said selecting means selecting a last maximum value of the fuzzy unification set to be defuzzified at which an associated regulation weight is a maximum, said selecting means including means for forming a corresponding activation signal for a knowledge base memory interface, means for forming a sham output value in one of:

a first center of gravity process from center of gravity coordinates and aggregated regulation weights of membership functions and a second center of gravity process from center of gravity coordinates, area measurement figures and aggregated regulation weights, said selecting means including a first adder with downstream counter register, a second adder with downstream denominator register, a multiplier and a divider for the first and second center of gravity process and the second adder being connected to form the activation signal if defuzzification is being carried out according to the maximum process, in which a signal for discriminating between a defuzzification according to the first or second center of gravity process is carried out in that all the area measurement figures are encoded with zero in the case of the first center of gravity process and by a corresponding discrimination signal being formed by means of a NOR operation on the bits of the respective area measurement figure.

4. A defuzzification device according to claim 3, further comprising:

via a first multiplexer, aggregated regulation weights from an inference unit or intermediate results from an interception register being alternatively fed to an input of a multiplier and via a second multiplexer, the area measurement figures or center of gravity coordinates are alternatively fed to a further input of the multiplier.

* * * * *